*INVENTOR.*
THOMAS L. FAWICK
BY *Willard D. Eakin*

ATTORNEY

Sept. 21, 1954   T. L. FAWICK   2,689,634
ACTUATING AND TORQUE-SUSTAINING STRUCTURE
FOR BRAKES AND CLUTCHES
Filed Jan. 8, 1951   2 Sheets-Sheet 2

INVENTOR.
THOMAS L. FAWICK
BY Willard D. Eakin
ATTORNEY

Patented Sept. 21, 1954

2,689,634

UNITED STATES PATENT OFFICE 2,689,634

ACTUATING AND TORQUE-SUSTAINING STRUCTURE FOR BRAKES AND CLUTCHES

Thomas L. Fawick, Cleveland, Ohio, assignor, by mesne assignments, to Federal Fawick Corporation, a corporation of Michigan Application January 8, 1951, Serial No. 204,850

12 Claims. (Cl. 192—91)

This invention relates to actuating and torque-sustaining structures for brakes and clutches.

One of its chief objects is to provide an improved spring-engaged and fluid-disengaged brake or clutch having circumferentially spaced friction-shoe assemblies all alike as to structure and direction of rotative movement for engagement, and thus to provide desirable circumferential distribution of engagement force and of torque-sustention, avoid bearing load and drum distorting forces, and permit close control of short-period engagements, as in the "inching" of a press or the like.

One of its specific objects is to provide an improved spring-engaged brake for industrial uses where spring-engagement is desirable because of the brake must dependably hold the mechanism, of a heavy press, for example, during periods of idleness as well as during periods of operation, without dependence upon continued functioning of fluid-pressure actuating or holding mechanism.

Other objects are to provide for supplementing the force of the springs, on occasion, by the force of fluid pressure; to provide improved mechanism inclusive of friction shoes and actuating mechanism adapted to be preassembled as a unit before being mounted, upon a stationary mounting as to a brake or upon a shaft as to a clutch, for association with a drum; and to provide such a mechanism adapted to provide a self-energizing effect for sustension of torque in either direction simply by being mounted with one side or the other inward with relation to the drum.

Further objects are durability and simplicity and economy of construction, replacement and repair.

Figure 1:
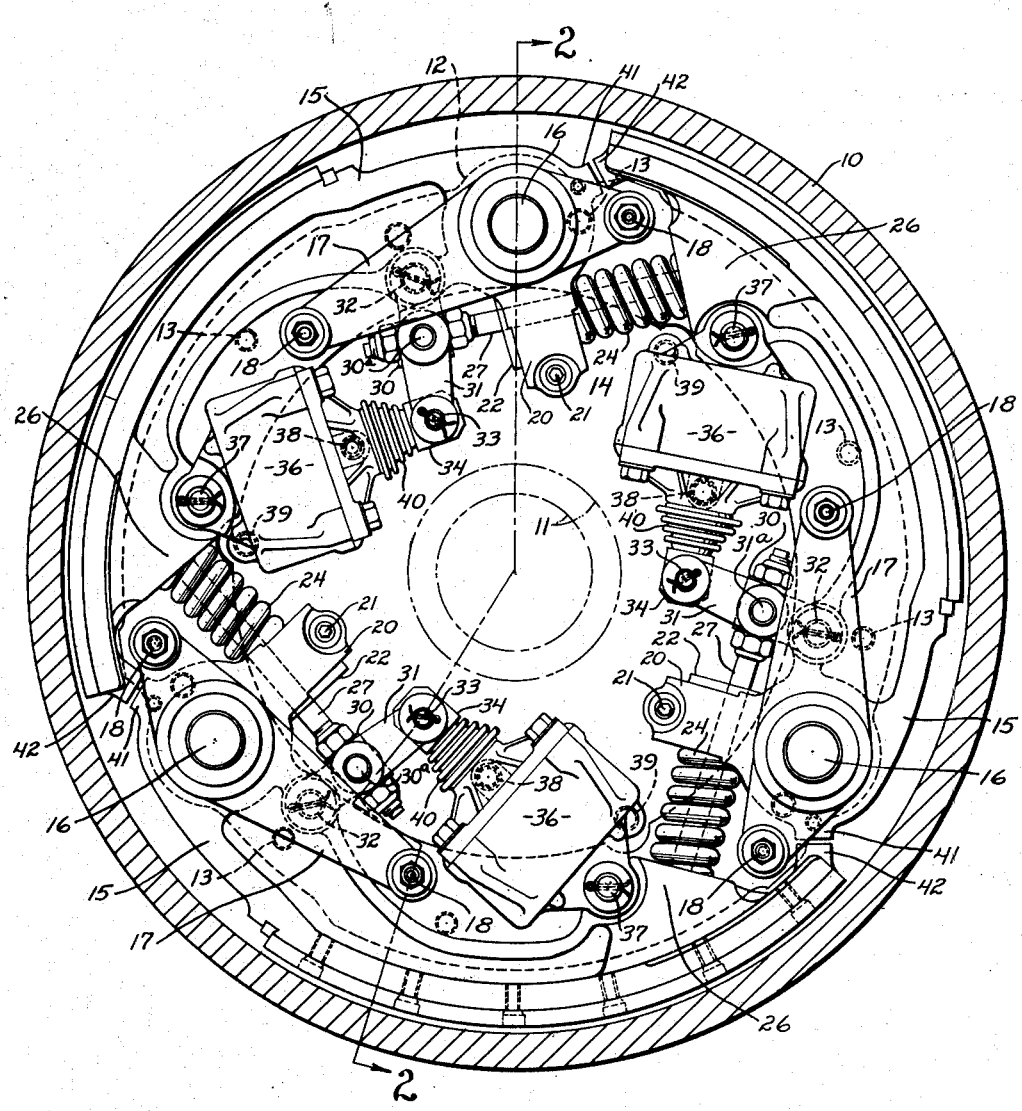
Fig. 1 is a section, transverse to the axis of rotation, of a brake drum with actuating mechanism therein embodying my invention in its preferred form, the actuating mechanism and the friction shoes being shown in elevation.
Figure 2:
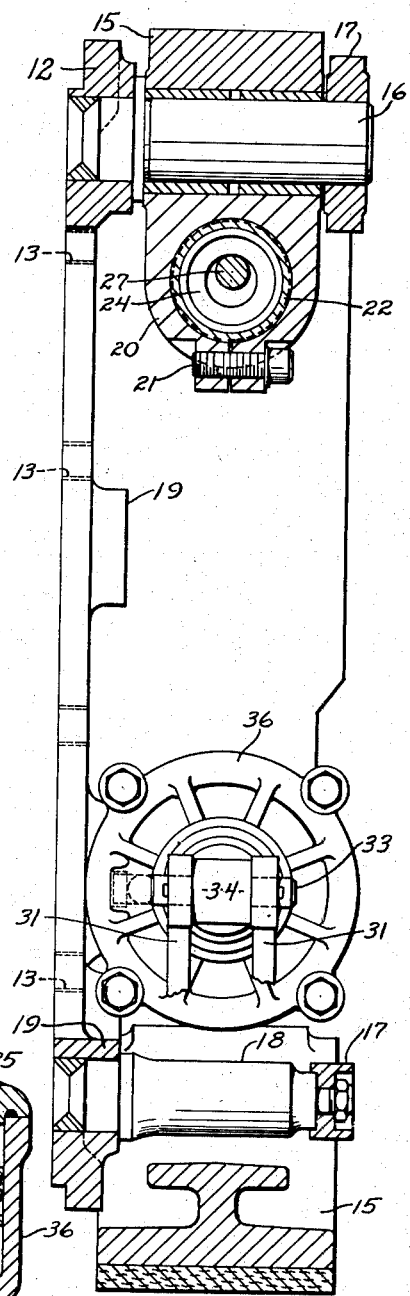
Fig. 2 is a section of the same on indirect line 2—2 of Fig. 1, but on a larger scale.

In Figs. 1 and 2, showing a brake for presses, the observer's view is toward the open side or end of the drum 10. The end of the shaft upon which the drum is secured, nearer to the observer than the plane on which the section is taken, is represented in broken lines at 11, Fig. 1.

An annular adapter plate 12, provided with threaded bolt holes 13, 13 is mounted upon a stationary member 14, which can be the frame of a press in the case of a brake for presses, and is the mounting for the assembly that includes the friction shoes, 15, 15 and the actuating mechanism.

Each shoe 15 is hinged on a stud 16 welded to (Fig. 2) and projecting from the adapter plate 12 and is held on the stud, and the stud is stabilized, by a shoe-retaining and stud-bracing plate 17 apertured part way of its length to surround the stud 16 and having its ends bolted to the adapter plate 12 by wide based stud bolts 18, 18 seated and welded in respective bosses 19, 19, on the adapter plate 12, clearly shown near the bottom of Fig. 2.

The hub of each shoe is formed with an inwardly projecting bifurcated spring-seat arm 20 having a clamping bolt 21 for tightening it upon and thereby retaining the adjustment of a through-apertured spring-seat liner 22 screwed into a threaded hole (Fig. 3) extending through the bifurcated portion of the arm 20.

Each of the liners 22 is formed with an internal shoulder supporting a flat ring 23 upon which is seated a strong compression spring 24, the other end of the spring bearing against a flat ring 25 seated against a shoulder in a through-apertured boss 26 on the adjacent shoe, near the swinging end of the shoe. The spring's seat on the last-mentioned shoe is at so great a distance from the shoe's axis at 16 and there is such distance of its seat on the arm 20 from the arm's axis at 16 that the springs exert strong engaging forces upon all of the shoes, which forces can be substantially equalized by the adjustment afforded by the threaded liners 22 in the bifurcated arms 20.

For overcoming the springs 24 and thereby disengaging the brake, each spring 24 has extending through it a rod 27 formed at one end, in the boss 26, as the ball member of a ball-and-socket joint. Its ball portion fits in an externally tapered ball-seating member 28 (Fig. 3) mounted in the boss 26 and is held in position by a screw plug 29 threaded into the through-apertured boss from the outer side of the latter and adapted, as a cap for the ball, to transmit outward thrust from the rod 27 to the shoe 15 on occasion.

At its other end each rod 27 is adjustably secured in a trunnioned block 30 whose trunnions 30ª are mounted respectively in a pair of twin levers 31, 31 whose ends are hinged respectively to the adjacent shoe 15 at 32, not far from the shoe's hinge axis 16, and, at 33, to the outer end of a piston-rod 34.

Figure 3:
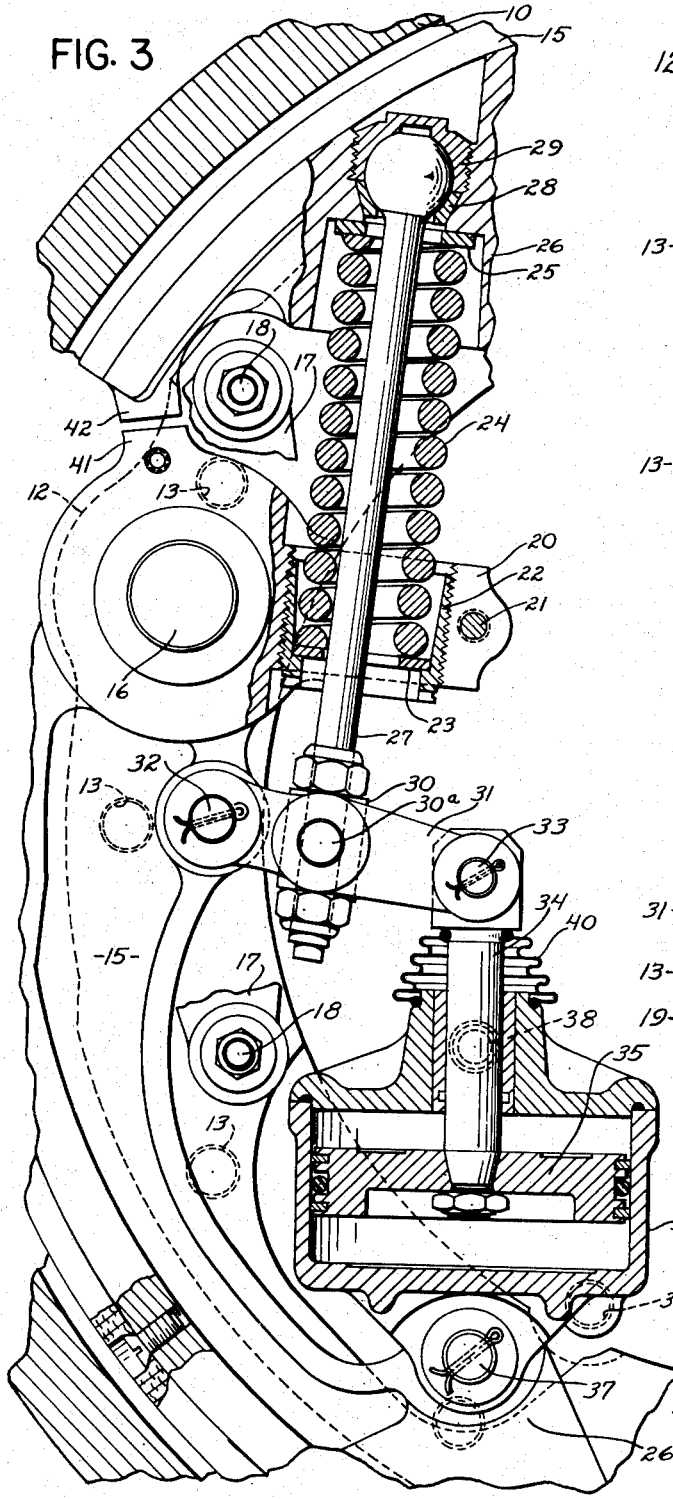
Fig. 3 is a fragmentary section corresponding to Fig. 1 but on a larger scale and with some parts of the actuating mechanism sectioned and broken away.

Each piston-rod 34 has on it a two-way piston 35, Fig. 3, in a cylinder 36 which is hinged at 37 on the boss 26 of the shoe that is next in series to the shoe against whose boss 26 the associated spring 24 exerts its brake-engaging force.

Each cylinder 36 is provided near its piston-rod end with a pressure-fluid inlet-outlet pipe socket 38 and suitable flexible piping (not shown) for charging the adjacent end of the cylinder 36 for taking off the brake and venting it to permit the springs 24 to put on the brake. Also each cylinder 36 is provided, at its other end, with a pressure-fluid inlet-outlet pipe socket 39 and suitable flexible piping (not shown) for charging that end of the cylinder, on occasion, to add the force of the piston 35 to that of the spring 24 to provide increased brake-engagement pressure of the shoes against the drum.

Each cylinder and its piston-rod can be connected, if desired, by an elastic oil-retaining and dust-excluding bellows member 40 surrounding the piston-rod and held in place by elastic annular beads formed on its ends and snapped into suitable annular retaining grooves in the piston-rod and in the piston-rod boss of the cylinder.

Preferably inward, disengaging movement of the shoes is limited by local stop means, such as the stop lug 41 on the hub of each shoe adapted to be abutted by a stop lug 42 on the swinging end of the adjacent shoe.

Permissibly, as in the illustrated embodiment of the invention, the positions of the several hinge axes and disposition of linkage members are such that each spring 24, at its respective ends, exerts an engaging force upon two of the shoes, and a line from the axis 32 to the axis 16 is at such an angle to the line of force received by the shoe at the axis 32 that each cylinder also applies retracting force to the shoe at 32, partially offsetting the force of the spring against the arm 20, and, in forcing the piston in the opposite direction for supplementing the engagment force of the springs, applies its engaging force to two of the shoes, and with substantial multiplication of its force by reason of the relative lengths of the two arms of each of the levers 31, and, in fact, by reason of the levers 31 being levers of the second class with regard to their being fulcrumed at 32 and having connection to the respective rods 27, at relatively great distances from the respective axis 16 of the shoes, with the line of thrust of the piston always approximately parallel to the spring's line of thrust. Also the springs 24 are adapted to provide strong engaging force by reason of the fact that the line of thrust of each spring is at least substantially tangential in relation to the axes 16 of both of the adjacent shoes upon which the spring acts.

Self energizing for one direction of torque with relation to the drum, and as to all of the shoes, is present because of the axes 16 being a substantial distance inward from the friction face of the drum, and the parts are such that the same self-energizing can be had for the other direction of torque with relation to the drum by simply reversing them, individually or collectively, upon the adapter plate 12, with reversal of the positioning of the studs 18, 18, or by reversing, upon its mounting, the adapter plate 12 or its equivalent with the other parts mounted upon it. As each shoe and actuating assembly is articulated to the next by the hinged connections at 32 and 37 and the ball-and-socket joints at 28, 29, all of the three such assemblies, continuing to be thus articulated, can be, if desired, preassembled and handled as a unit in mounting them upon or in removing them from the adapter plate.

One of the advantages of the assembly as shown and described is that when the direction of relative rotation of the two structures is such as to provide self-energizing of the shoes the self-energizing is the same as to all of the shoes, because they are hinged for engaging movement in the same rotative direction. Consequently the friction facings of all of the shoes can be of the same hardness.

Various modifications are possible without sacrifice of all of the advantages set out in the above statement of objects and without departure from the scope of the invention as defined in the appended claims.

I claim:

1. An assembly of the character described comprising two relatively rotatable structures adapted for frictional, torque-sustaining engagement with each other, one of said structures comprising a member having an annular frictional-engagement face and the other of said structures comprising a mounting, a plurality of wear shoes each hinged near one of its ends at a fixed position on said mounting for rotation of the shoes all in the same rotative direction about their respective hinge axes for engagement with the said frictional-engagement face, a spring for each shoe constantly urging the shoe to rotate in said direction toward engaging position, and pressure-fluid means opposed to each of the springs for effecting disengagement of the shoe, the said spring for each shoe and the said pressure-fluid means having their force-applying contact with the shoe on the same side of the hinge axis of the shoe and, as to both, near the swinging end of the hingedly mounted shoe.

2. An assembly as defined in claim 1 in which each of the springs is a compression spring and is interposed between two of the shoes so that it urges both of them in the same rotative direction.

3. An assembly as defined in claim 1 in which the pressure-fluid means is double-acting, the assembly including means whereby the force of the pressure-fluid means in one direction is applicable for overcoming the spring and in the other direction for supplementing the shoe-engaging force of the spring.

4. An asembly as defined in claim 1 in which a lever is interposed between the pressure-fluid means and the shoe for multiplying the force of the pressure-fluid means.

5. An assembly as defined in claim 1 in which a lever, fulcrumed upon one of the shoes, is interposed between the pressure-fluid means and an adjacent shoe, for multiplying the force of the pressure-fluid means.

6. An assembly as defined in claim 1 in which each shoe is provided with a spring seat near its outer end and with a spring-seat arm projecting from it adjacent its hinge axis and each spring is a compression spring interposed between the said spring seat and the said spring-seat of one shoe arm of the next shoe.

7. An assembly as defined in claim 1 in which the springs, pressure fluid means and all of the members interconnecting them are mounted upon and wholly supported by the shoes.

8. An assembly as defined in claim 1 in which each of the springs is a compression spring and is interposed between two of the shoes so that it urges both of them in the same rotative direction, the assembly including adjusting means on one of the shoes for varying the loading of the spring.

9. An assembly as defined in claim 1 in which the defined mounting has studs projecting from it as hinge pins for the respective shoes and other studs projecting from it and connected one with another by means associated with the outer end portion of a respective hinge-pin stud for stabilizing the latter.

10. An assembly as defined in claim 1 in which the defined mounting has studs projecting from its face as hinge pins for the respective shoes and has removable means connecting the mounting with the outer end portion of each hinge-pin stud for stabilizing the latter.

11. An assembly as defined in claim 1 in which studs projecting from the recited mounting constitute the only articulation of the mounting to the shoes, springs and pressure-fluid means.

12. An assembly as defined in claim 1 in which each of the pressure-fluid means is hinged upon one of the shoes.

References Cited in the file of this patent

UNITED STATES PATENTS

| Number | Name | Date |
| --- | --- | --- |
| 1,680,204 | Charles | Aug. 7, 1928 |
| 2,126,849 | Weiss | Aug. 16, 1938 |
| 2,215,546 | Dick | Sept. 24, 1940 |
| 2,503,891 | Van Voorhis | Apr. 11, 1950 |
| 2,527,865 | Weiland | Oct. 31, 1950 |
| 2,529,121 | Weiland | Nov. 7, 1950 |